INVENTOR.
James E. Underwood
ATTORNEY

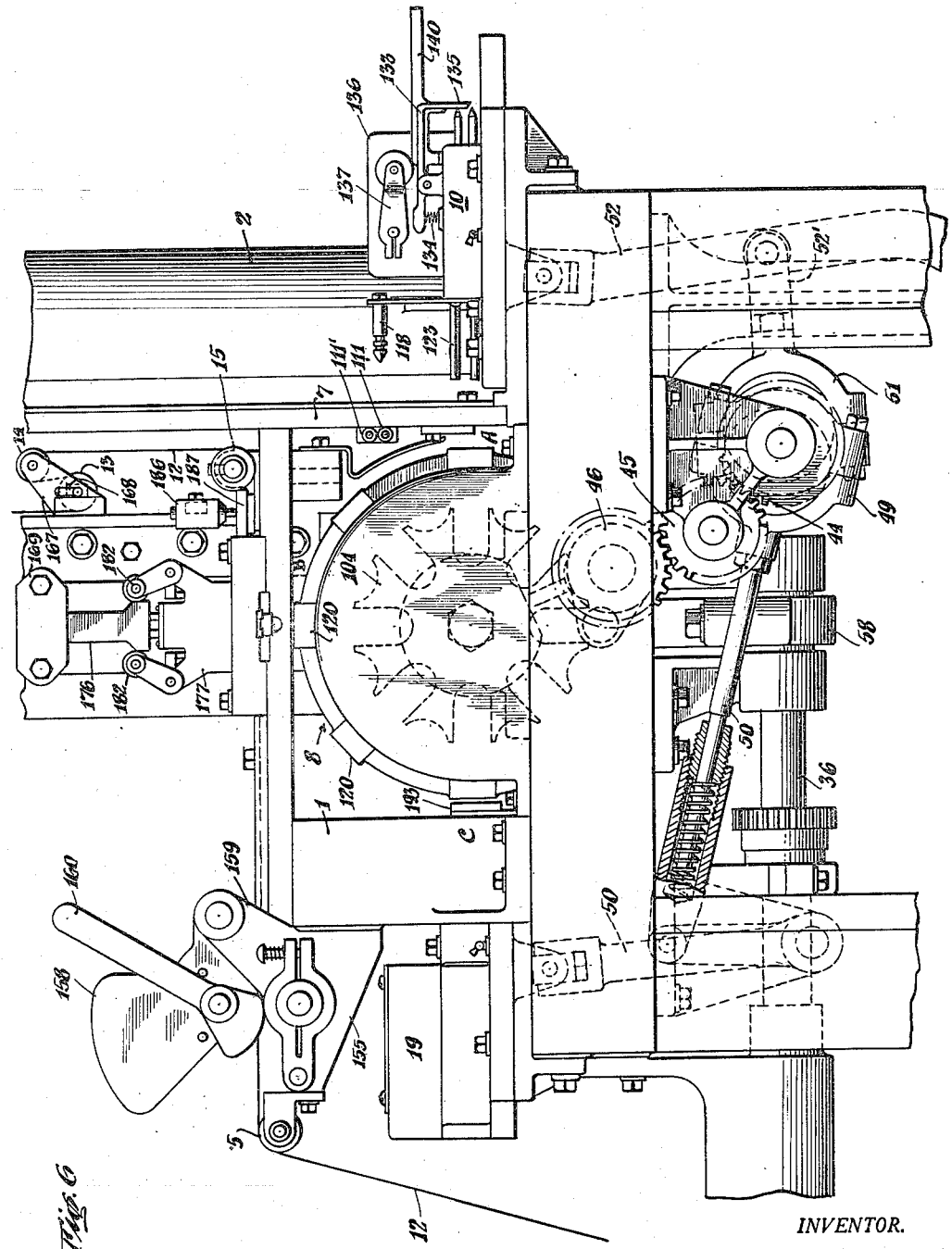

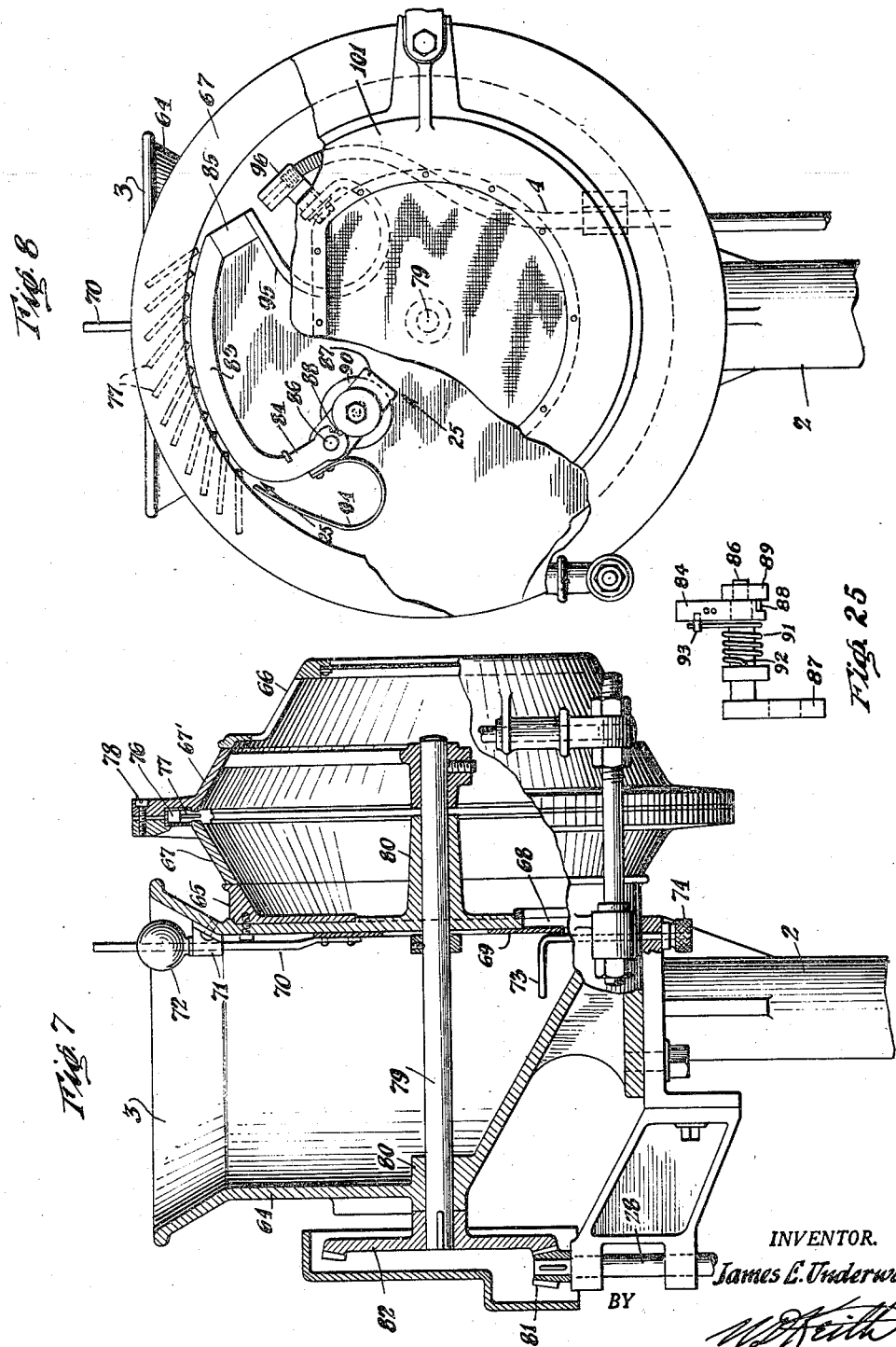

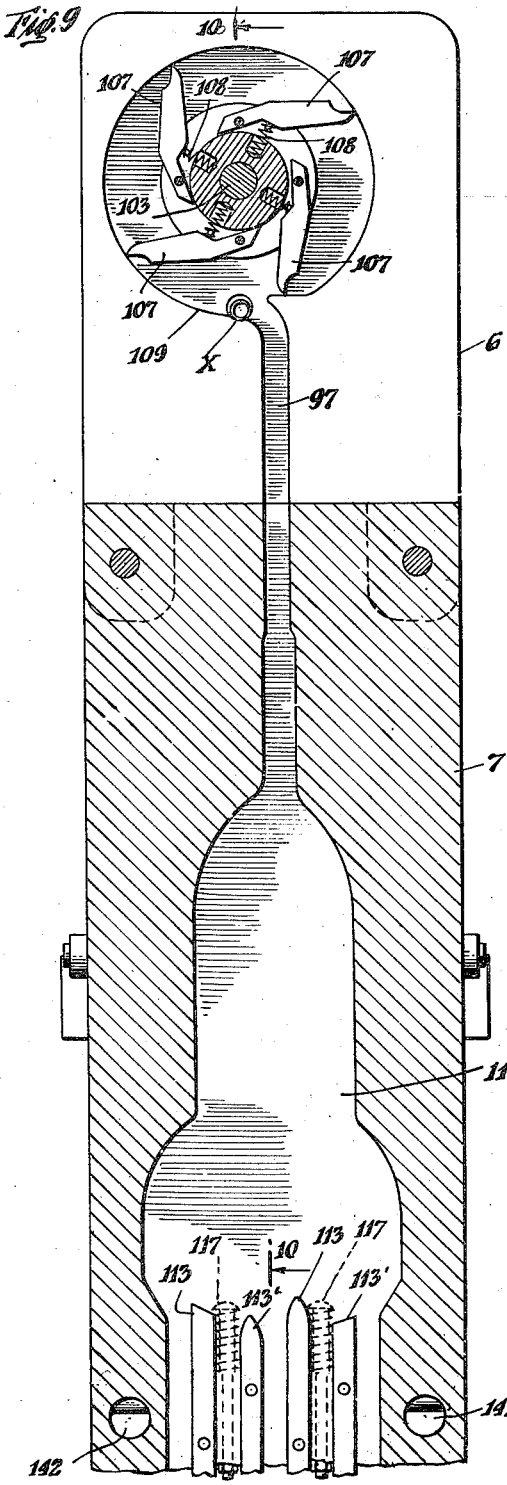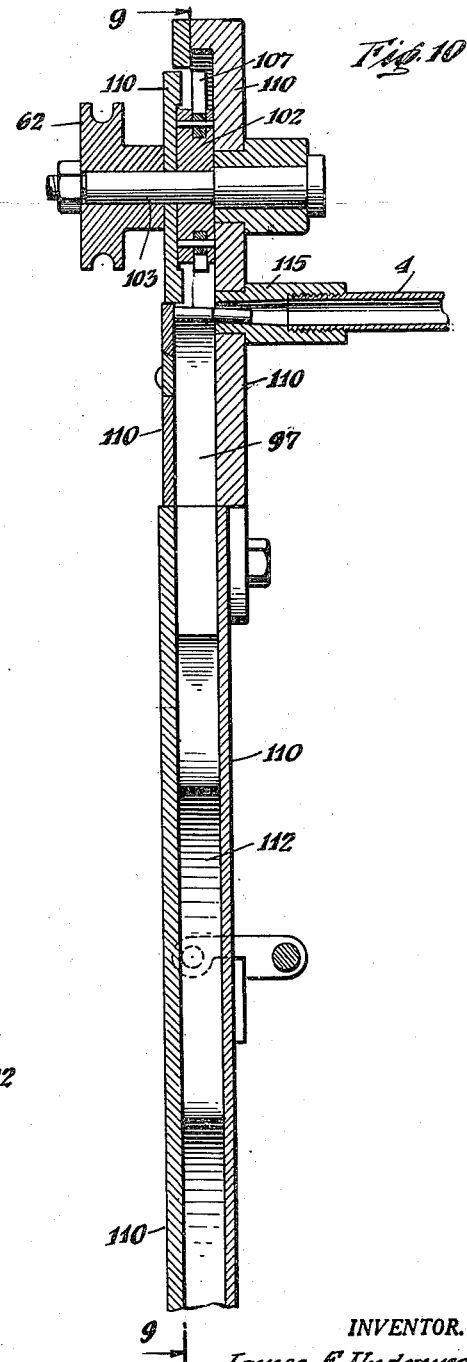

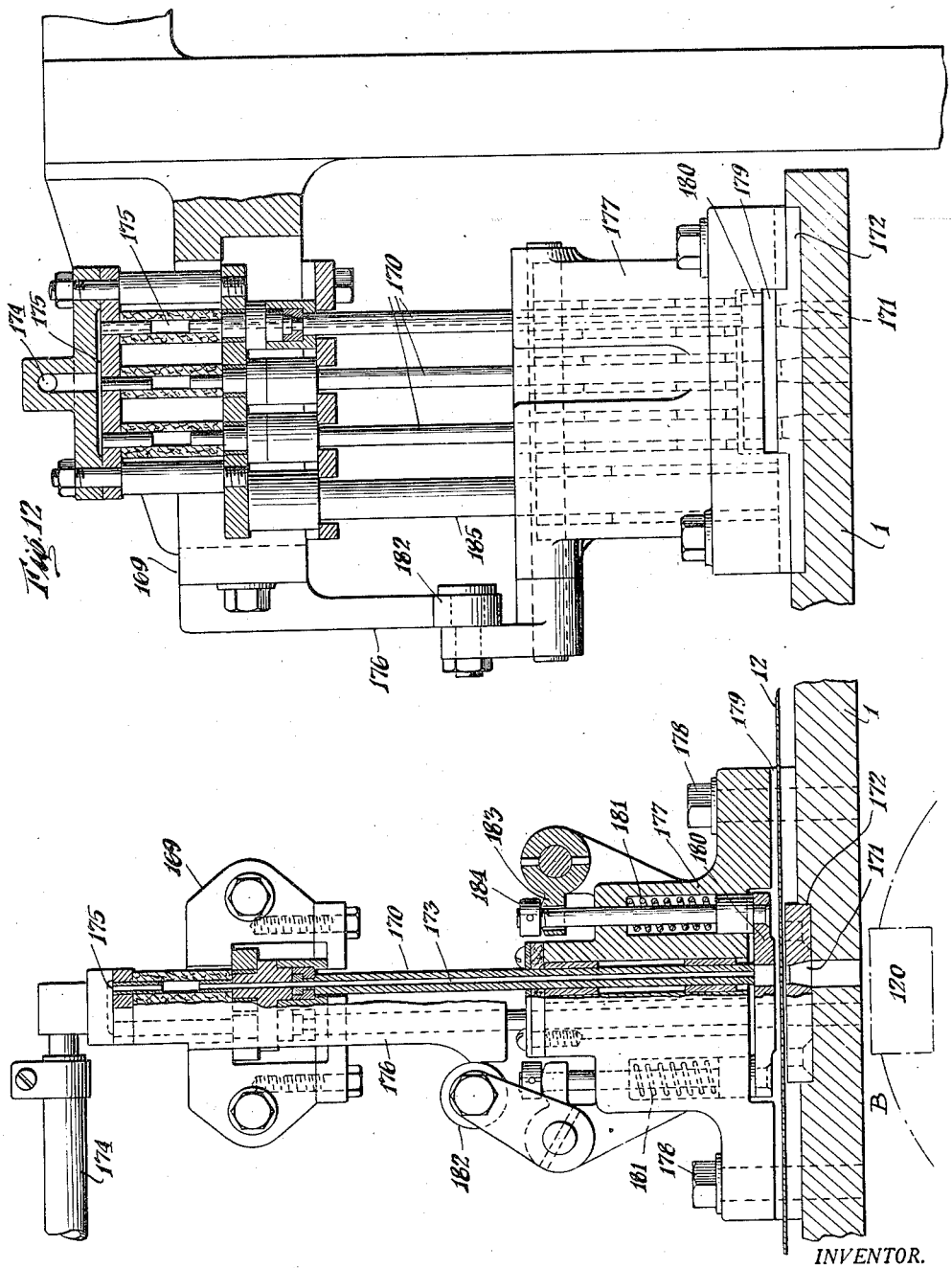

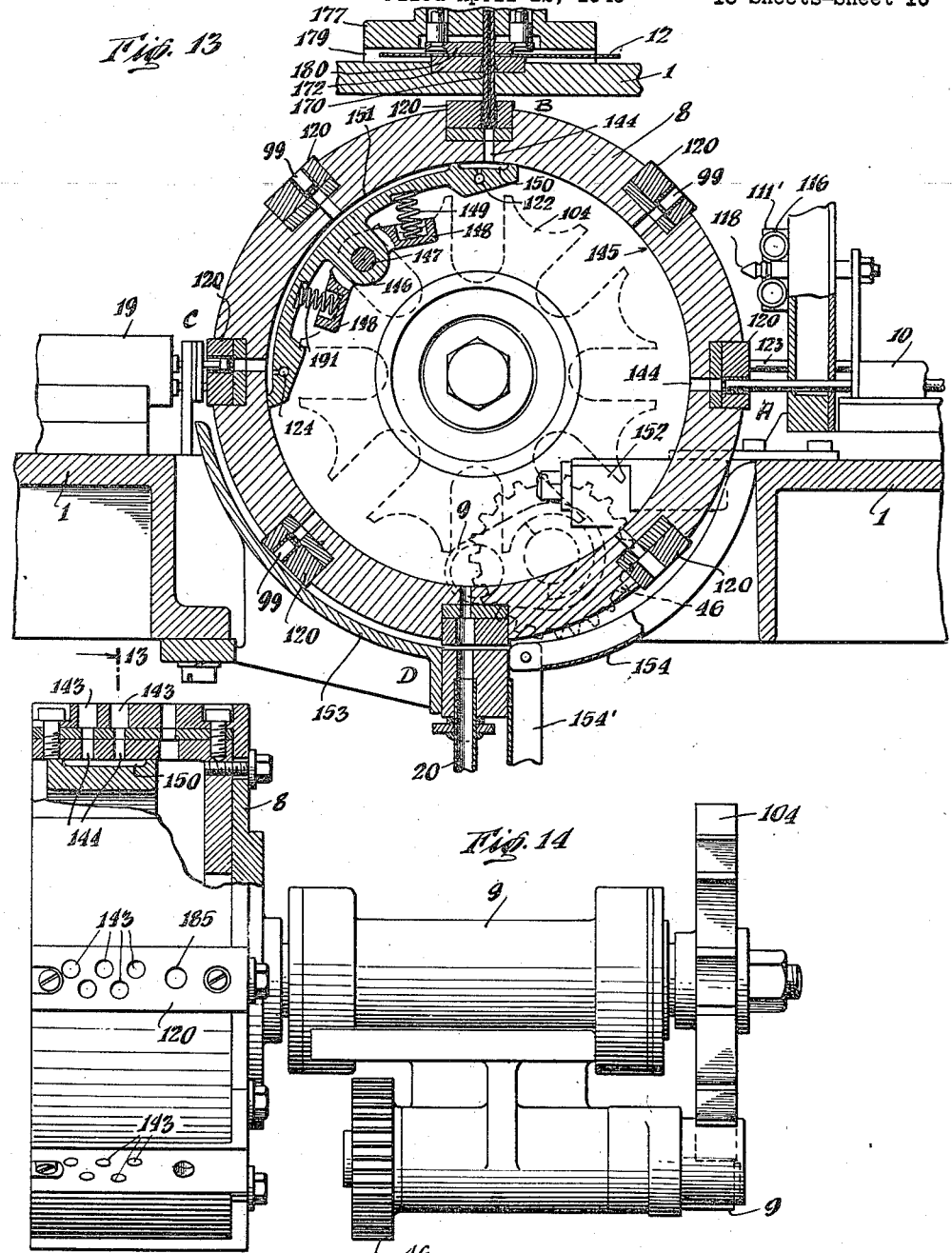

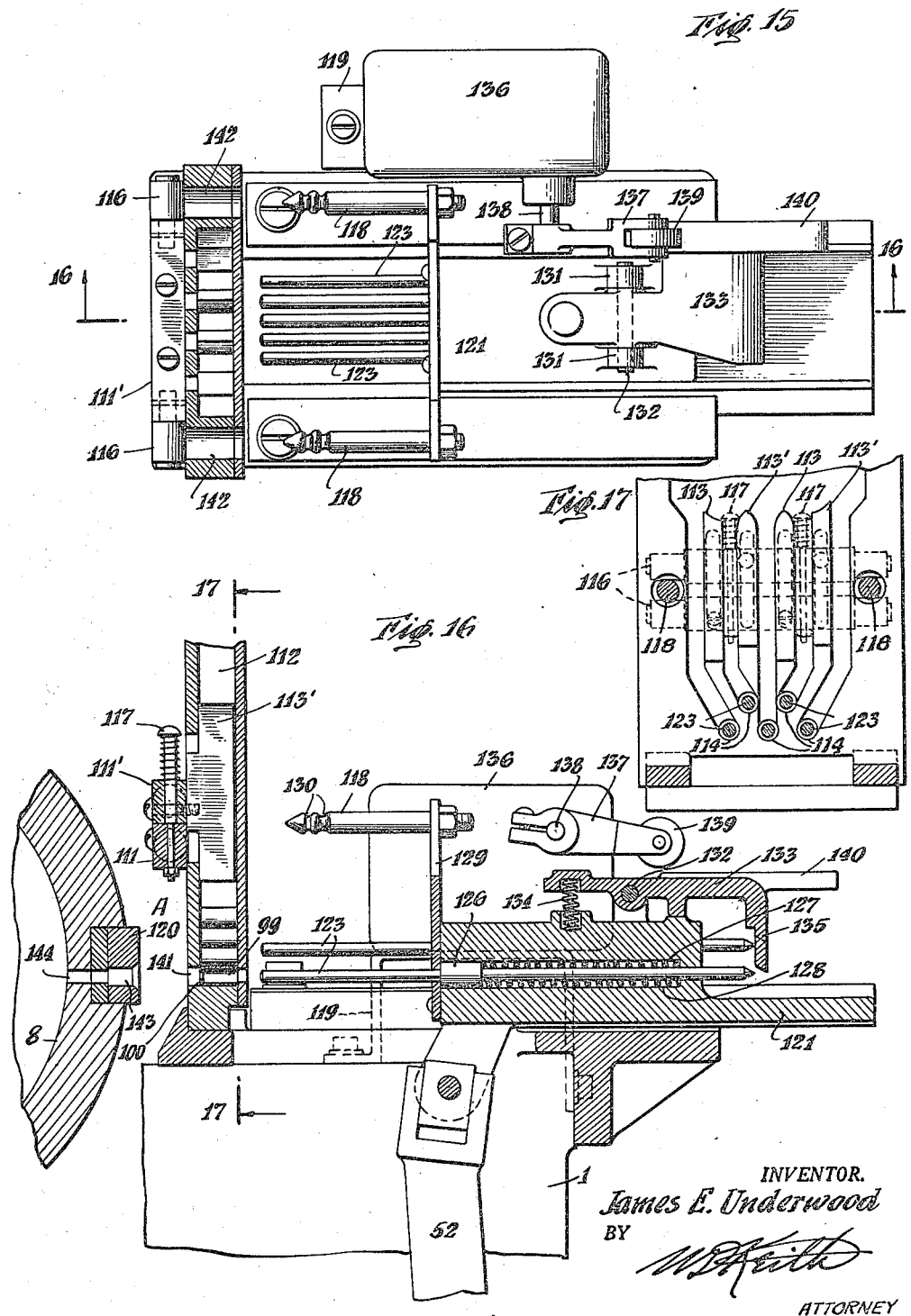

July 30, 1946.   J. E. UNDERWOOD   2,405,074
METHOD AND MACHINE FOR ASSEMBLING ARTICLES
Filed April 12, 1943   13 Sheets-Sheet 12
Fig. 18
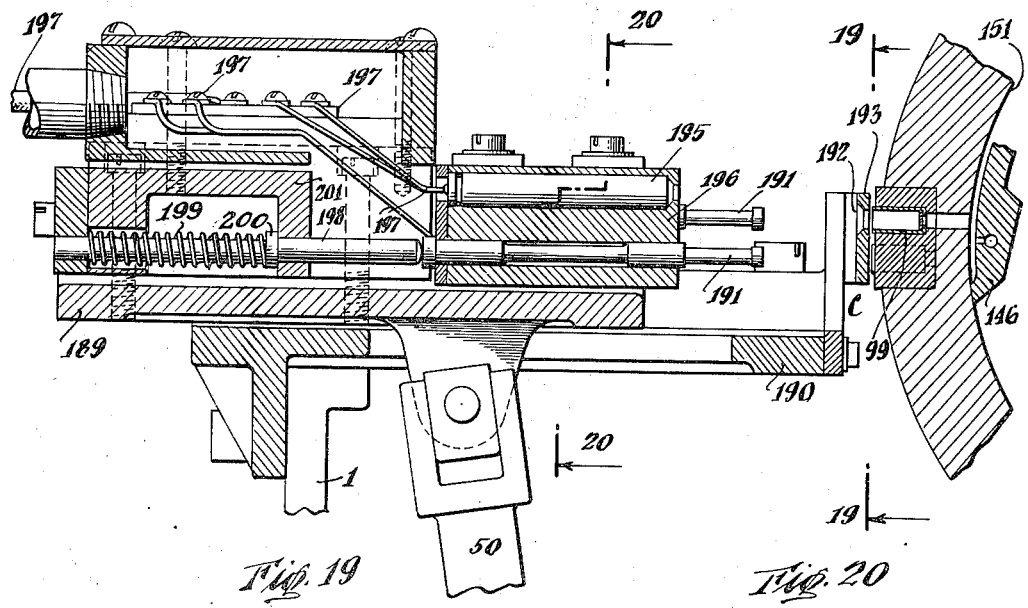
Fig. 19
Fig. 20
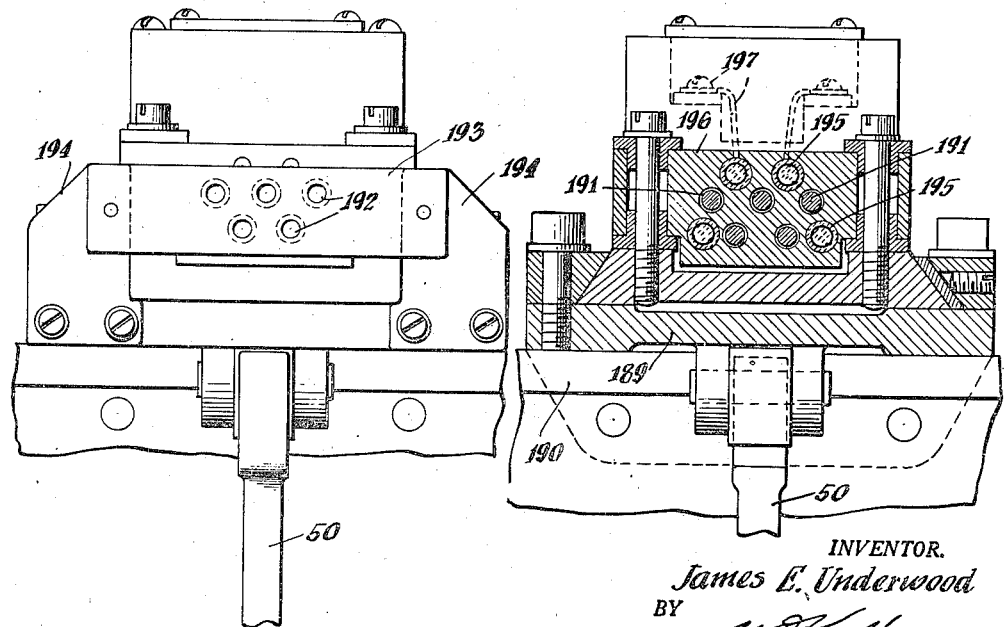
INVENTOR.
James E. Underwood
BY
ATTORNEY

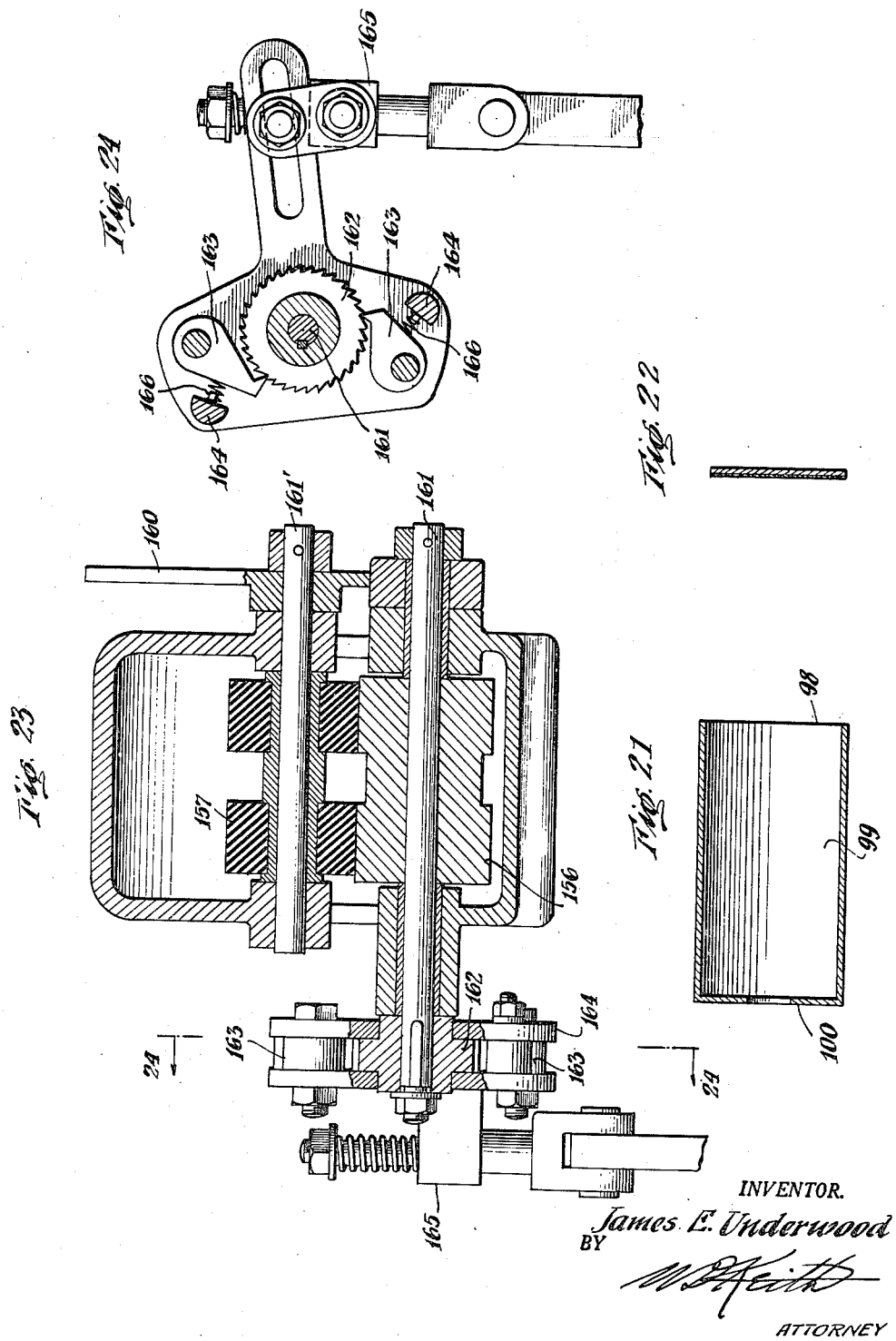

Patented July 30, 1946

2,405,074

UNITED STATES PATENT OFFICE 2,405,074

METHOD AND MACHINE FOR ASSEMBLING ARTICLES

James E. Underwood, Oakmont, Pa., assignor to Aluminum Company of America, Pittsburgh, Pa., a corporation of Pennsylvania Application April 12, 1943, Serial No. 482,739

14 Claims. (Cl. 154—1)

This invention relates to improvements in machines of the class adapted to assemble a disc, wafer, washer or other shape made of relatively thin or pliable material with a receiving member. The problems to which the invention is specifically directed are those attendant upon positive, accurate and relatively rapid assembly of thin metal wafers with cup-like or tubular articles, but the principles of the invention are useful in, and may be applied with equal facility to, the assembly with another article of a shape composed of any thin, pliable or difficultly handled material, all of which shapes will be referred to herein and, in the appended claims, as "thin shapes."

Among the more general objects of the invention is the provision of a machine, and component parts thereof, which will operate continuously and at a relatively high speed to perform an assembling operation; which will accurately and positively handle thin wafer-like parts; which will accurately and positively handle relatively heavier parts of different or the same shape; which will maintain a constant flow to the point of assembly of the parts to be assembled; which will bring all parts to the point of assembly in proper position and will there accurately position the parts with respect to each other; which will perform operations on the assembly to unite the parts or otherwise permanently establish the assembled relationship and which will automatically and continuously inspect the finished assemblies and reject the imperfect. Among other objects is the provision of machines which will automatically and continuously perform all or a part of these indicated steps in predetermined sequence without intervention of the operator. A further object of the invention is the provision of improved machine assemblies and parts thereof adapted to perform, singly or in combination, the functions above enumerated. Another object is the provision of an improved article handling system adapted to present to a work station from an unoriented mass of cup-like or tubular articles a flow of said articles each in a predetermined oriented position. Another object is the provision, in combination, of machine elements and pneumatic means adapted to furnish a shape from a supply of thin or pliable material and to thereafter positively and automatically maintain said shape in predetermined positions during handling and working operations. Other and further objects will appear in the following description of a machine, and parts thereof, which embody in preferred form and for a particular purpose, the various principles of this invention.

The machine shown in the appended drawings and herein specifically described is designed to produce a detonator tube assembly. Two parts are to be assembled. One, the detonator cup, is tubular in form with an open end and a partially closed end. The other is a foil wafer adhesively treated on one side and cut, during the operation of the machine, to such size that it may be seated within the detonator cup in position to completely close the partially closed end thereof. When so seated, with its adhesively treated side in contact with the tube, the foil wafer is adapted to be adhesively united to the tube, thus sealing the partially closed end thereof. The elements of the machine which insure this result may be generally described as an article handling system including a hopper assembly and a feed assembly adapted to feed detonator cups from the hopper to the machine in predetermined oriented position, a foil supply and feed asembly adapted to feed foil from which said wafers may be cut to the operation and to remove therefrom scrap or unused foil, a turret assembly adapted to receive cups from the feed assembly and to present the cups to the various work stations, a die and punch assembly adapted to cut wafers from the foil supply and to feed said wafers to the cups, a hot punch assembly adapted to seal the wafer to the cup and if desired, an inspection unit adapted to search each detonator tube assembly to determine if it is properly assembled to reject imperfect assemblies. These elements and various cooperating elements are all shown in the drawings in which:

Fig. 6 is a partial vertical section of the machine taken in a plane at 90° to the section shown in Fig. 5;

Fig. 7 is a vertical section taken through the hopper of the machine, as indicated at line 7—7 on Fig. 1 with parts omitted;

Fig. 8 is a side view of the hopper with certain parts cut away to show detail thereof;

Fig 9 is a vertical section taken through a portion of the tube handling and feeding mechanism to which the tubes are delivered from the hopper;

Fig. 10 is a vertical sectional view taken at the line 10—10 indicated on Fig. 9;

Fig. 11 is a vertical view, partially in section, of the die and punch assembly;

Fig. 12 is another vertical view of the die and punch assembly at 90° to the view shown in Fig. 11;

Fig. 13 is a vertical sectional view through the turret also showing portions of other cooperating parts;

Fig. 14 is another view, partially in section, of said turret and its driving mechanism;

Fig. 15 is a top view of the transfer slide assembly;

Fig. 16 is a vertical sectional view, taken at line 16—16 on Fig. 15, of the transfer slide assembly and the lower part of the feed assembly;

Fig. 17 is a view of the lower portion of the feed assembly, taken at line 17—17 on Fig. 16;

Fig. 18 is a vertical sectional view through the hot punch assembly;

Fig. 19 is an end view of the hot punch assembly, taken as indicated by line 19—19 on Fig. 18;

Fig. 20 is a vertical section through a portion of the hot punch assembly, taken as indicated by the line 20—20 on Fig. 18;

Fig. 21 is a representation of a detonator cup before assembly;

Fig. 22 is a representation of the foil wafer which is to be assembled with the detonator cup to form the final detonator tube;

Fig. 23 is a vertical section taken through the foil feed mechanism;

Fig. 24 is a view taken at the line 24—24 as indicated in Fig. 23; and

Fig. 25 is a view of the guide plate and its mounting taken in the direction of the arrows 25—25 in Fig. 8.

Like numerals refer to like parts throughout the several views.

Figure 1:
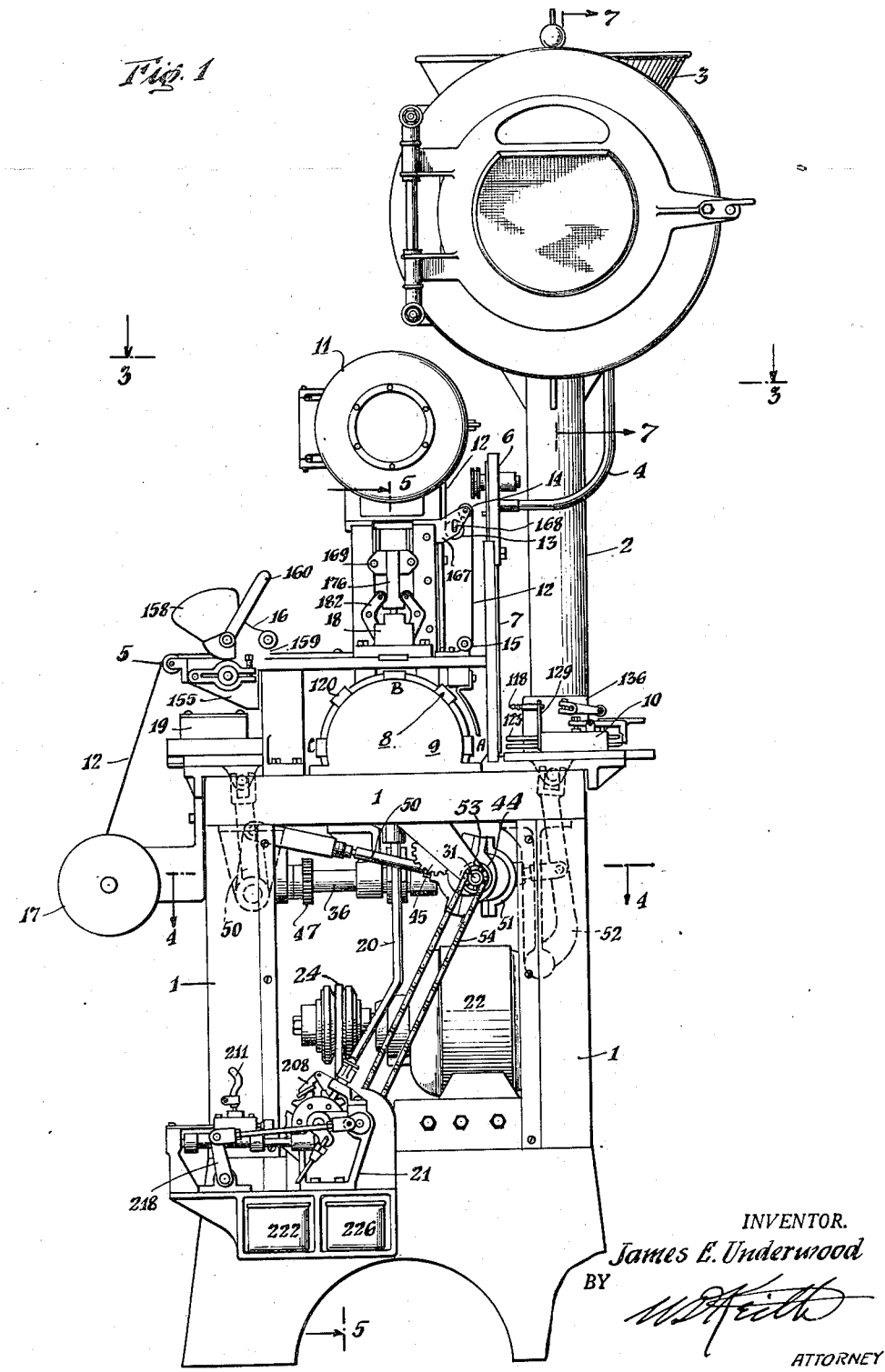
Fig. 1 is a side view of a machine embodying the invention.
Figure 2:
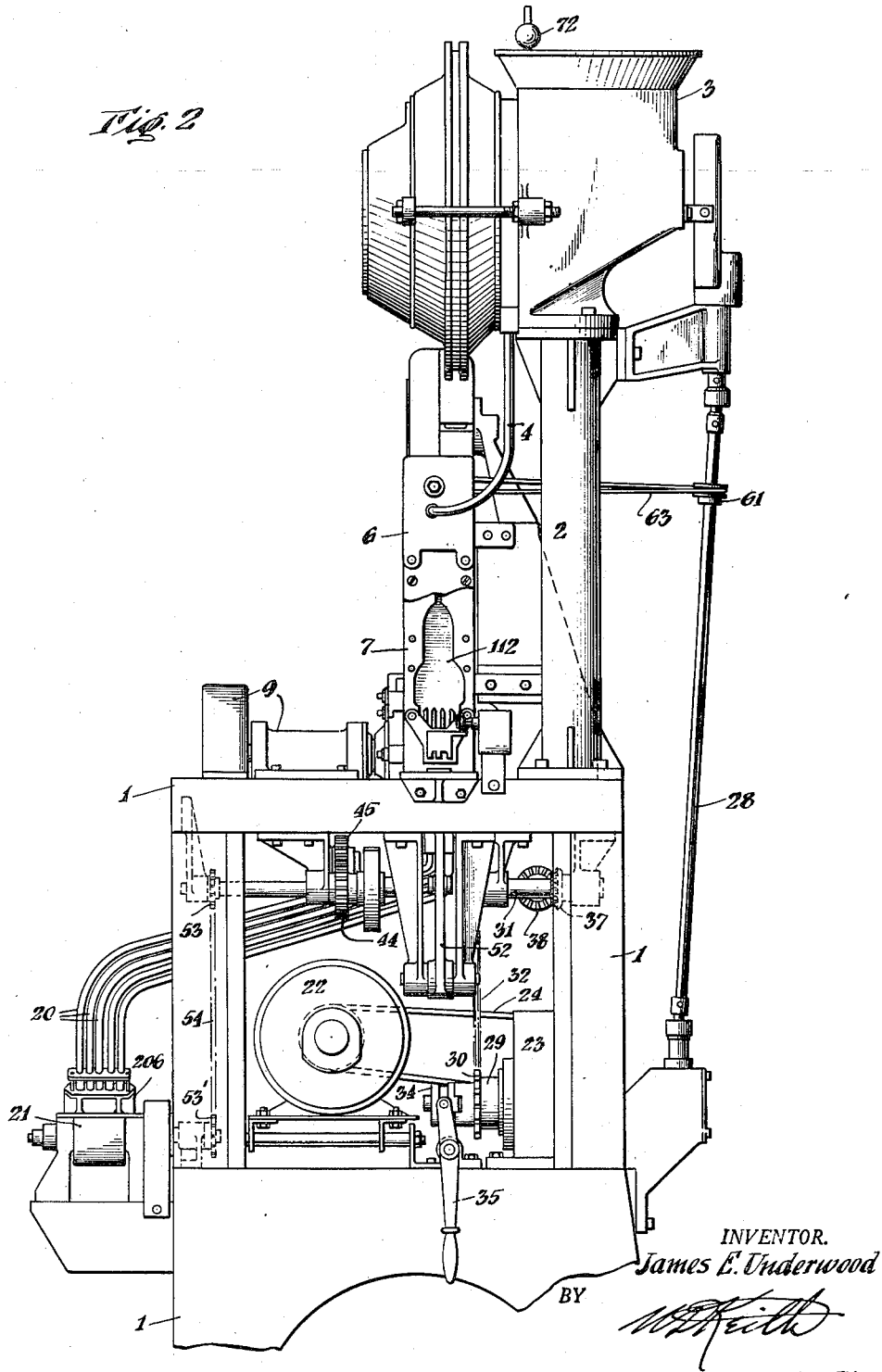
Fig. 2 is another side view of the machine at 90° to the view of Fig. 1.
Figure 3:
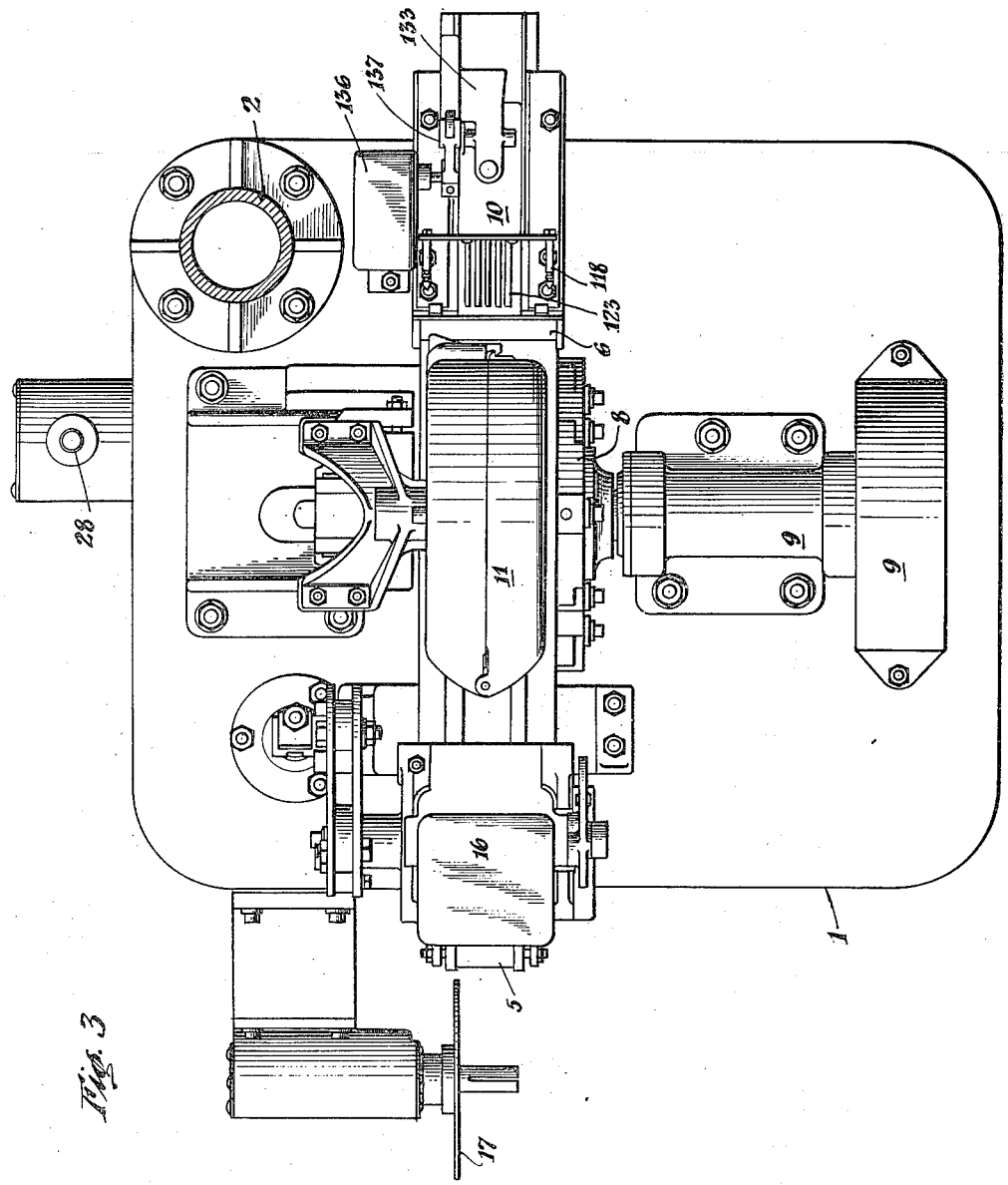
Fig. 3 is a view taken from above the machine as indicated at line 3—3 on Fig. 1.

The general organization of the machine is best shown by Figs. 1, 2 and 3. The machine is carried by a frame most parts of which are generally indicated by the numeral 1. Mounted on this frame is the article handling system consisting of the hopper 3 mounted on post 2, the transfer tube 4, the turning mechanism 6, the chute mechanism 7 and the transfer slide assembly 10. A work translating means such as turret 8, actuated by Geneva drive 9, is adapted to receive work at turret station A and to present it to various assembly operations at stations B and C. A foil supply and feed system includes supply reel 11 from which the foil 12 travels over rollers 13, 14 and 15 through foil feed mechanism 16 over roller 5 to rewind reel 17. Mounted above turret 8 at station B is the die and punch assembly 18. Mounted at station C is the hot punch assembly 19. Leading from turret station D (shown in Fig. 13) are transfer tubes 20 which deliver finished assemblies from that station to an inspection unit 21. A pneumatic system, not shown in detail, cooperates with various of these elements, as will be later described.

The driving mechanism of the machine is best shown by reference to Figs. 1, 2, 4, 5, 6 and 7. All motive power is derived from motor 22 which drives speed reducer 23 through belt 24 and the pulley shown. Shaft 25 of the speed reducer drives the hopper 3 through gears 26 and 27 and shaft 28. Speed reducer shaft 29 with its sprocket 30 drives shaft 31 through chain 32 and the sprocket 33. A clutch generally indicated at 34 and actuated by handle 35 engages and disengages speed reducer sprocket 30, thereby starting and stopping all elements driven thereby. Shaft 36 is driven off shaft 31 through bevel gears 37 and 38. The free end 39 of shaft 36 drives the foil rewind reel 17 through a friction clutch, not shown. A pump 40, designed to furnish vacuum or air to a pneumatic system through valve 41, is driven through gears 42, 43 from the motor driven end of the speed reducer shaft. Valve 41 is driven by shaft 36 through gears 47, 48. Gears 44, 45, 46 actuate the Geneva drive 9. The hot punch assembly 19 is reciprocated toward and away from turret station C by linkage 50 which is actuated by eccentric 49 mounted on shaft 31. The transfer slide assembly 10 is reciprocated toward and away from turret station A by linkage 52 which is actuated by eccentric 51 mounted on shaft 31. Gear 53 mounted at the end of shaft 31 drives the inspection unit 21 through chain 54 and gear 53'.

The movable portions of die and punch assembly 18 and the knockout pins 55, mounted, respectively, on slides 56, 57, are reciprocated toward and away from the turret stations by linkage 59 which is actuated by eccentric 58 mounted on shaft 36. Eccentric 60, likewise mounted on shaft 36, actuates the foil feed mechanism 16. Turning mechanism 6 is driven through pulleys 61, 62 and belt 63 from hopper drive shaft 28. It will be understood that the driving parts are coordinated to cause simultaneous action at all stations on the work simultaneously presented to those stations by the work translating device.

Referring now to Figs. 7, 8, and 25, the hopper 3 consists of an article-receiving portion 64 fixed on post 2. Parts 65 and 66 are carried by part 64 and, together with the rotatably mounted hopper ring parts 67, 67', form an extension thereof. The articles placed in the receiving portion 64 are admitted to the extension thereof through opening 68 which may be closed by means of a gate 69 supported for vertical movement on rod 70, bracket 71 and handle 72. Finger 73 is rotatably mounted in the bottom of receiving portion 64 and, by means of knurled knob 74, may be swung to facilitate passage of the cups through the opening 68. The hopper ring parts 67, 67' are adapted to include, in assembly, the selector such as a pin ring 76 which carries a multiplicity of pins 77 mounted therein at the angle shown in Fig. 8. It will be understood that pins 77 are provided entirely around pin ring 76 and extending inwardly, although for purposes of clarity only that pin adjacent the section line is shown in Fig. 7 and only a representative number of pins sufficient to show their spacing is shown in Fig. 8. The guide plate and associated parts are also omitted from Fig. 7. Parts 67, 67', and pin ring 76 are secured together as by bolts 78, and the assembly is fixed on shaft 79 which shaft is rotatably mounted in bearing portions 80 and is driven by shaft 28 through the pinion 81 and gear 82. Guide plate 83 is formed of a central portion substantially concentric with pin ring 76 (as shown in Fig. 8) and with its opposite ends 84, 85 turned inwardly therefrom. The guide plate is mounted for limited movement around axle 86 of guide bracket 87, its limited movement on said axle being positively governed by pin 88 which is positioned on guide bracket collar 89 and extends within the cutaway portion of guide plate end 84. The guide plate bracket 87 is secured to a boss 90 on hopper part 65. A spring 91 surrounds the axle of guide bracket 87 with one end 92 thereof fixed to the bracket and the other end thereof bearing against a pin 93 on guide plate end 84 so that the spring tends to resist downward movement of the guide plate and to return it to normal position where its central portion is concentric with pin ring 76. Mounted on the end of guide plate 83 is the flexible finger 94 and on the other end the bracket 95 upon which is carried the terminus 96 of transfer tube 4. In Fig. 8, the collar 89 (Fig. 25) is removed to show the cutaway portion in guide plate end 84 to receive pin 88, and in Fig. 25, the flexible finger 94 (Fig. 8) is removed for clearer showing of the guide plate mounting.

In operation, the cups, having been admitted from the cup-receiving portion of the hopper to the extension of the hopper through the opening 68, tumble to the bottom of the hopper extension as the ring portions are rotated by shaft 79 and carry the pin ring 76 with them through the mass of tumbling cups. In their travel, the pins 77 enter the open ends 98 of detonator cups 99 (see Fig. 21) and bear the cups upwardly in a clockwise direction, as shown at Fig. 8. There, as the rotation of the pin ring brings the pins toward an angle below the horizontal, the ends of the cups are contacted, and are held upon the pin, first by the flexible finger 94 and later by the central portion of the guide plate 83, and the cups are thus continuously held upon said pins until they reach the end 85 of the guide plate, at which time they lose contact with the guide plate and fall by gravity into the terminus 96 of transfer tube 4 and travel downwardly through said tube with the closed ends of the detonator cup 99 in the forward position. In the event that a cup is wrongly seated upon a pin 77 or becomes canted thereon or otherwise tends to jam against the central portion of the guide plate 83, damage is prevented as the guide plate yields by partial rotation against the spring 91 around the bracket axle 86, said spring returning the guide plate to its original position after the pressure is removed.

Detonator cups entering transfer tube 4 fall therethrough by gravity, their partially closed ends forward, to the floor of the turning mechanism 6, the details of which are best shown at Figs. 9 and 10. The turning mechanism, positioned between the hopper 3 and chute mechanism 7, provides for feeding the endwise-falling detonator cups into transfer slot 97 in a sidewise position. For that purpose the turning mechanism consists of a wheel 102 fixed upon a shaft 103 which is rotated by means of pulley 62 fixed on the end thereof, belt 63 (see Fig. 2) and the pulley 61 mounted on hopper drive shaft 28. Carried by wheel 102 are fingers 107 which are yieldingly, but firmly, held by springs 108 against the floor 109 of the circular chamber. The housing plates 110 are cut to form a slot 97 leading from its aperture in the floor of the transfer chamber to the multiple chute chamber 112. The detonator cups, having been oriented by the selector 76 and delivered thereby to transfer tube 4 in oriented position with their closed ends forward, pass through the tube in end-to-end position, the shape and size of the tube 4 being such as to maintain an end-to-end flow. They are thus singly delivered to the floor 109 of the transfer chamber where housing plate 110 forms an abutment to limit the forward motion of each cup as it frees itself of the transfer tube 4 and thus leave the cup on the floor at the position X indicated in Fig. 9. In this position the cup lies across the travel of members 107 each of which has an end portion shaped to receive the cup. The outlet from the chamber to passage 97 affords means positioned in the path of travel of the fingers 107 to receive and remove the cups from the chamber as they are swept across the floor by said fingers, and the passageway 97 and chamber 112 are so proportioned as to maintain the cups in the side-by-side relationship established by their flow through this aperture. Thus, the end-to-end flow of the cups originally established in tube 4 is terminated and the flow re-established in side-by-side position without, however, change in the orientation of the cups originally fixed by the selector hopper to present the perforate bottom of the cup toward the station to which the cups are travelling. The bottom portion of multiple chute chamber 112 is divided, as shown in Figs. 2, 9 and 15, but best shown in Fig. 17, into five cup feeding passages by the dividers or fingers 113, 113'. Each of said passages terminates at a fixed position 114. The detonator cups fall into the chamber 112 from where they pass into the five cup feeding slots, the lowest cup in each slot lying in the terminus position 114. Fingers 113 are carried upon cross bar 111 while the fingers 113' are carried upon cross bar 111'. These cross bars are mounted on housing plate 110 for vertical movement with respect thereto, and the end of each cross bar is provided with a roller 116. The cross bars are held together in normal position through the medium of spring loaded bolts 117. The cross bar rollers 116 are so arranged that a wedge or pin, such as agitator pin 118, forced between said rollers, will separate the cross bars against the action of the springs on bolts 117, thus moving fingers 113' apart from fingers 113 and imparting movement to the mass of cups lying in the chamber 112, which movement facilitates passage of the cups into the cup-feeding slots. The cups, lying in the bottom of the cup-feeding slots in position to be fed to the turret mechanism, present their closed ends 100 toward the turret 8 at turret position A, this orientation of the cups having been achieved by the turning means above described, which, while changing the downward travel of the cups from an endwise fall to a sidewise fall, does not disturb the disposition of the cups originally established on delivery to transfer tube 4.

The turret 8 has positioned on its periphery a number of cup-receiving chucks 120 in each of which are provided the cup-receiving apertures 143 (as best shown in Fig. 14). When a chuck 120 is presented at turret station A these apertures have the same axis as the termini 114 of the five cup slots which lie at the bottom of the multiple chute 112. Cups are periodically transferred from their position at termini 114 to the apertures 143 of a turret chuck 120 by the transfer slide assembly 10.

Transfer assembly 10, shown at Figs. 1, 3, 6 and 13 but best shown at Figs. 15 and 16, consists of a carriage 121 mounted on frame 1 for periodic translation toward and away from turret station A by the linkage 52 which is actuated by eccentric 51 mounted on shaft 31. Rods 123, corresponding in axial position and number to cup chute termini 114 and to turret chuck apertures 143, are mounted in said carriage. Each such rod consists of a forwardly extended portion and a rearwardly extending portion and of a slide bearing portion 126 which latter is positioned in rod chamber 127 and normally held at one end thereof by spring 128. Mounted on the carriage is bracket 129 which carries the agitator pins 118 whose function, as above described, is to pass between rollers 116 and cause separation of the cross bars which carry fingers 113 and 113' in the multiple chute assembly. The ends of these pins 118 are notched, as shown at 130, to agitate the rollers as they pass therebetween, thus imparting a jerking movement to the cross bars and the fingers attached thereto. In Fig. 17 which is otherwise a view on line 17—17 of Fig. 16, the agitator pins 118 and transfer rods 123 are shown in advanced position. Likewise mounted on transfer slide carriage 121 by means of brackets 131 and pin 132 is the pivoted arm 133 which is normally positioned, by action of spring 134, as shown in Fig. 16, to place its downwardly extending portion 135 directly behind the rearward ends of the pins 123. Mounted separately of the assembly 10 and on fixed bracket 119 is switch 136 which carries switch arm 137 on switch shaft 138. Switch arm roller 139 is adapted to be contacted by the surface 140 of the arm 133 when it is raised against the action of the spring 134.

In its normal cycle, the transfer slide assembly 10 going forward from the position shown at Figs. 15 and 16 brings its rods 123 through apertures in the chute housing into the cups 99 which lie in termini 114. Under continued forward motion the rods contact the semi-closed ends 100 of said cups and carry the cups through apertures 141 into the cup-receiving apertures 143 of that chuck 120 which is, at that moment, positioned at turret station A. Simultaneously the agitator pins 118 passing through the apertures 142 in the multiple chute housing 110 contact and pass between the rollers 116, thus causing relative movement of fingers 113 and 113', as above described, and facilitating movement of the cups into the cup slots therebetween. At the end of this operation the transfer slide assembly is again returned by linkage 52 to its original starting position from where the cycle is again repeated as the next chuck 120 is indexed at turret station A. If a cup lying in the cup chute termini 114 is bent or otherwise damaged or is wrongly positioned so as to prevent the free passage thereinto of a transfer rod 123, the rod yields backwardly against the action of spring 128 until its rearward portion contacts the downwardly extending portion 135 of the arm 133, thus raising the arm into contact with the roller of the switch arm 137 and tripping the switch 136 to stop the machine and allow removal of the offending cup. The downwardly extending portion 135 is notched to allow the upper pair of rods 123 the same clearance as the lower three rods as shown in Fig. 2 and by the dotted line in Fig. 16.

Figure 5:
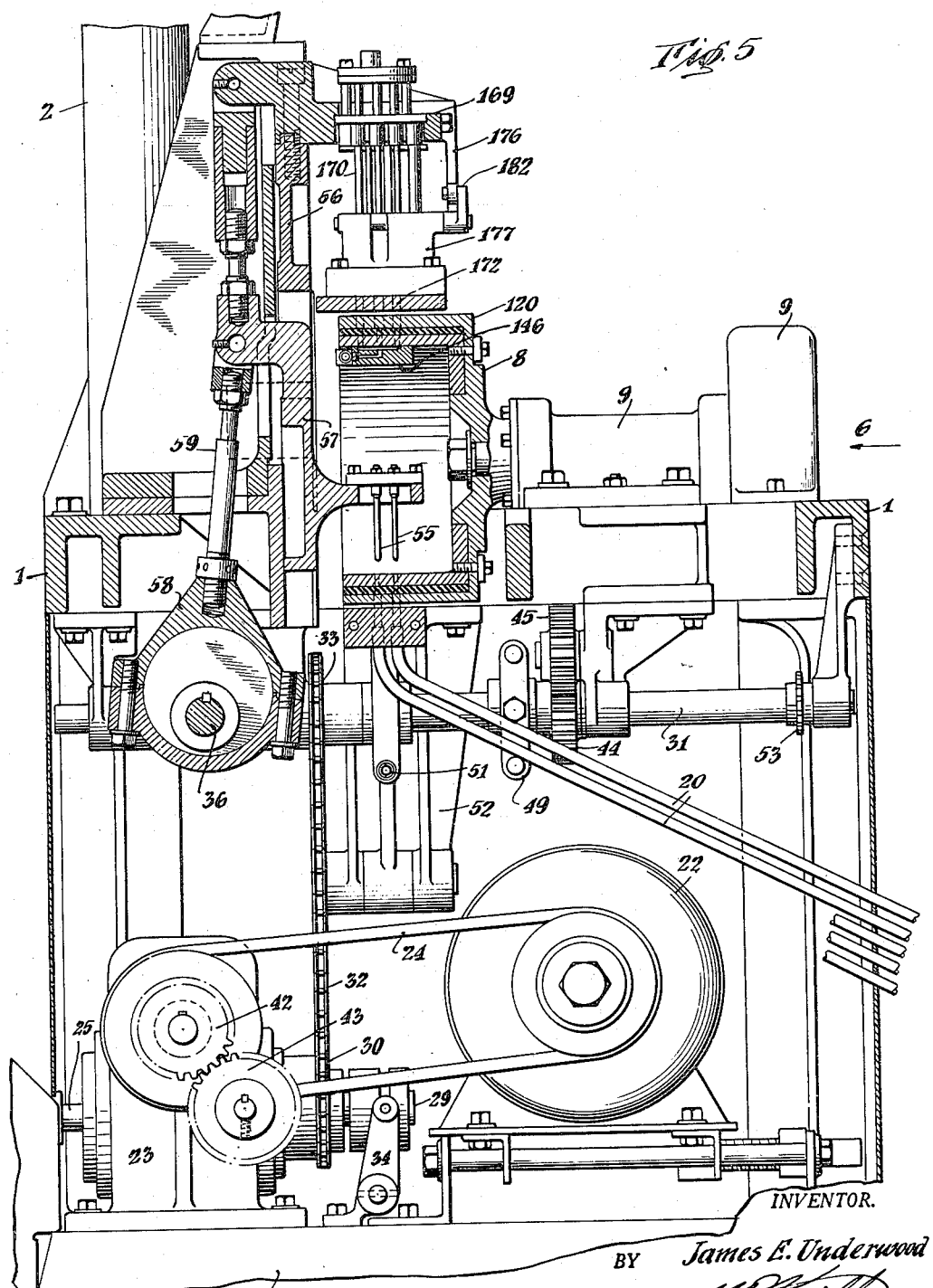
Fig. 5 is a partial vertical section of the machine shown in Fig. 1 taken at the line 5—5 indicated on Fig. 1.

Referring now to Figs. 1, 5, 6 and particularly to Figs. 13 and 14, the turret 8 is actuated by a conventional Geneva drive 9, indicated by the Geneva wheel 104 and the driving gears 44, 45, 46, to momentarily index and halt the chucks at successive positions counterclockwise including operation stations A, B, C, and D and the stations intermediate thereof. Each turret chuck 120 is, as above described, provided with a number of cup-receiving apertures 143 (five as here shown). Passages 144 connect the bottom of each such aperture 143 with the interior of the turret 8.

Movement of the turret successively presents a chuck 120 to station A to receive the detonator cups, to station B to receive the foil wafers, to station C to present the work to the hot punch assembly 19 and to station D where the finally assembled detonator tubes are discharged, with the help of knockout pins 55, into transfer tubes 20. During the rotation of the turret, the inner turret surface 145 continually contacts stationary vacuum shoe 146 which is fixed against turret surface 145 (by means of bracket-carried pin 147, arms 148 and springs 149) to cover that segment of the inner turret surface which is, at any given moment, at and included between stations B and C. Thus means are furnished whereby vacuum may be maintained in the vacuum chambers 150 and 151 formed by the vacuum shoe and turret surface 145 when the passages 144 are sealed by an impervious article seated in the cup-receiving apertures 143 in which said passages terminate. Positioned at the intermediate turret station midway between station D and station A is an air feed mechanism 152 which furnishes a continued air blast through the passages 144 and apertures 143 to clean foreign matter therefrom. Plate 153 positioned between turret station C and turret station D is concentric with the turret periphery and prevents loose detonator cups from falling from the chucks during movement between these stations. Parts 154 and 154' form a guide to govern the fall of such cups as are not, for one reason or another, well seated in chuck apertures 143 by the action of the transfer assembly.

Foil wafers (shown in Fig. 22), which are to be preliminarily seated in the detonator cups at station B and finally cemented thereto at station C, are cut from a supply of foil furnished to the cutting die and punch at station B. The particulars of this foil supply will now be described with reference to Figs. 1, 3, 6, 23, and 24.

The foil is supplied to the machine from the undriven foil reel 11 which rotates to deliver foil 12 only when foil feed mechanism 16 pulls the foil. Foil reel 17, constantly driven off shaft 36 through a friction clutch, rewinds the foil matrix from which the foil wafers have been cut. The general path of the foil is from reel 11, under roller 15, thence above turret station B where the cutting of the wafers takes place, thence through foil feed mechanism 16, over idle roller 5 and finally onto reel 17. Since cutting of the foil takes place intermittently as each turret station is indexed at station B, the foil feed action is likewise intermittent so that the foil will be stationary during the cutting operation at station B and will move forward at the end of that operation to present to the next cutting operation, as the next turret chuck is indexed at station B, a new uncut portion of foil. To this end the foil feed means 16, which is supported by bracket 155, in the position shown in Figs. 1 and 3, includes a knurled foil-driving roller 156 against which the foil is held by the rubber roller 157, carried on shaft 161', which is carried with weight 158 on bracket 159. This assembly of rubber roller and weight may be lifted, when desired, by handle 160. The axle 161, upon which is fixed the knurled roller 156, has fixed on one end a ratchet 162 upon which lie dogs 163 carried on a frame 164 adapted to be oscillated around axle 161 by linkage 165 which is, in turn, actuated by eccentric 60 on shaft 36. Thus, the dogs 163, which are held in engagement with the ratchet 162 by springs 166, are adapted, upon movement of frame 164, to turn axle 161 at predetermined intervals through a predetermined arc, thus positively rotating knurled roller 156 and advancing the foil a predetermined distance. It will be readily understood that the foil feed mechanism just described jerks the foil feed intermittently, at predetermined intervals, thereby playing out foil from reel 11 and causing slack between the feed mechanism and reel 17, which latter, being constantly driven, promptly reels up the slack foil. To prevent this jerking action from unwinding from reel 11 more foil than is used, coacting rollers 13 and 14 are provided on bracket 167. Floating roll 13 is journalled in bracket slot 168 so that it may move upwardly as the foil is advanced to resist the foil advancing action, thus avoiding transmission of the initial tensioning shock to supply reel 11. Once the foil is advanced and the tension imparted by the feed mechanism is terminated, roller 13 gradually falls under its own weight to the bottom of slot 168, unreeling as it falls sufficient foil from reel 11 to allow of this movement. Idle rollers 15 and 5 are conveniently located for the purpose of guiding foil 12 in its indicated path. Foil 12 is adhesively coated on one side and is wound on the reel 11 with its adhesively coated surfaces outward so that said surface is presented downwardly at turret station B.

Located at and above turret station B is the die and punch assembly 18 which provides a means for cutting the foil wafers and placing the cut wafer in detonator cups held in turret chucks 120 as said chucks are presented to station B. Assembly 18 is carried on slide 56 and crosshead 169 and is adapted to be reciprocated toward and away from turret station B by linkage 59 actuated by eccentric 58 mounted on shaft 36 (Fig. 5). The die and punch assembly consists of punches 170 (here shown as five in number) positioned in axial alignment with die apertures 171 in the die plate 172 and with the cup-receiving apertures 143 in the turret chuck 120 (see Fig. 13). Chambers 173 in punches 170 are provided to admit air or vacuum to the work, which air or vacuum is supplied to said chambers through duct 174 and chambers 175. Stationary block 177 fixed to the machine frame 1, as is die block 172, by bolts 178, forms with the die block a passage 179 through which passes foil 12. Attached to crosshead 169 is cam plate 176. Mounted in stationary block 177 for vertical movement is the die stripper plate 180 which is forced downwardly by action of springs 181 when the crosshead and punch assembly is moved toward the die, thus clamping the foil strip firmly against the die block for the punching operation. As the punches are retracted upwardly, the surface of the upward-moving cam plate 176 pushes cam followers 182 outwardly (as shown in Fig. 11), thus raising lever arms 183 against springs 181. The cup-receiving apertures 143 in the turret are accurately aligned with the punches and there maintained throughout the punching operation by indexing arrangement consisting of pin and aperture 185. In operation, the foil, after having been advanced through passage 179 by the foil feed means above described, comes to a halt before a turret chuck 120 is completely indexed at station B. The crosshead 169 and its punches 170 are then lowered causing stripper block 180 to press the foil against the die plate 172 as the punches cut through the foil and carry the foil wafers thus cut and seated on their ends through the die apertures 171 beyond the die plate and into the bottom of cups 99 seated in the chuck.

The final position of the punch in its utmost lowered position is shown in Fig. 13. During downward travel of punches 170, vacuum is applied in punch chambers 173 thus insuring that the foil wafers when cut will adhere to the ends of the punches and be carried thereby to the lower ends of the cups. The vacuum is terminated as the punches reach the lower end of their travel and is replaced by an air blast which displaces the wafers from the punches and forces them into position in the cups 99, thereby sealing the perforated bottoms of the cups the perforations of which are in register with the passageways 144 which connect the apertures to the vacuum chamber 150. At approximately the same time that the vacuum is broken in the punches and air is applied, the vacuum chamber 150 formed by the vacuum shoe 146 and inner turret wall 145 is supplied with vacuum to firmly hold the wafers against the bottoms of the cups. However, during the downward travel of the punches and during the cutting operation no vacuum is maintained in chamber 150 lest the foil wafers be drawn away from the ends of the punches before the punches have completed their downward travel. On the other hand, in the chamber 151, likewise formed between the vacuum shoe and the inner wall of the turret, the vacuum is constantly maintained to insure that the foil wafers will be firmly held in the bottoms of the cups as a turret chuck indexes through the intermediate station to station C and during operations at station C.

At station C is positioned the hot punch assembly 19, the construction and general operation of which will now be described with reference particularly to Figs. 18-20, inclusive, and Fig. 13. The hot punch assembly is mounted on plate 189 which is adapted to be reciprocated toward and away from turret station C on slide plate 190 by linkage 50 actuated by eccentric 49, the latter being mounted on shaft 31. The hot punch assembly consists of hot punches 191 (here shown as five in number) which are in axial alignment and in like number with the cup-receiving apertures of a chuck 120 indexed to station C and are likewise in like number and axial alignment with the apertures 192 in the stripper plate 193 which is fixed, as shown, by brackets 194 on the slide plate 190. Heating elements 195 disposed in punch block 196 maintain a proper predetermined temperature in block and punch. Suitable electric connections, generally indicated at 197, furnish electrical energy to the resistor type heating elements. Rods 198, restrained against unlimited forward movement under the action of the springs 199 by collars 200 bearing on wall 201, are positioned immediately behind each of said hot punches 191 and maintain the punches in working position, as shown in Fig. 18. In operation the hot punch assembly advances as the turret chuck indexes and dwells at station C. The punches pass through the apertures 192 in the stripper plate 193 and thence into the cup 99 and against the foil wafer 195 positioned at the bottom thereof and there held by vacuum from chamber 151. The heat and pressure thus furnished by the punch acts upon the coat of adhesive positioned on that side of the foil wafer which contacts the bottom of the cup and firmly cements said foil wafer to the detonator cup bottom. The pressure exerted by the hot punch tends to move the punch backward against the action of the spring loaded rods 198 which firmly but yieldingly, as to prevent breakage or damage to the work, hold the punches in position against the foil wafer. At the end of a short time the hot punch assembly is reciprocated away from the turret, the stripper plate 193 insuring that the assembly of detonator cup and foil wafer, which sometimes adheres to the hot punch, is not withdrawn from the turret chuck.

Knockout pins 55 mounted on slide 57 (see Fig. 5) operate after a turret has indexed at station D to push the now assembled detonator tube from the chuck and into the transfer tubes 20 which, as shown, lead to the inspection unit but which, if desired, may lead to a convenient receptacle if an inspection unit is not used. Said knockout pins are in axial alignment and in like number with the passages 144 which lead from the bottom of the apertures 143 to the inner wall of the turret. The knockout pin movement is actuated by the same means and is simultaneous with the movement of the punches 170 which operate at station B.

Thus, the machine, to the extent specifically described above, comprises means for selecting cups or similar articles from a mass thereof, means for orienting said cups in a position consistent with future work thereon, means for transferring the oriented cups to a work carrying means, means for preparing and preliminarily assembling with said cups a shape made of thin material, means for completing the assembly and means for delivering the assembled articles from the operation. All of said means act in the order named and automatically. In a mechanism of this character, where, as is the case in the particular example chosen, the final assembly must be positive and without defect, it is important that the machine likewise inspect the assembled items to reject those which are improperly assembled. To that end an inspection unit, such as that indicated at 21, to which the completed assemblies are delivered through transfer tubes 20 may be used. Such an inspection unit may take several forms, and the type of said unit forms no part of the present invention. A preferred type of unit is that described and claimed in my copending application, Serial No. 531,685, filed April 18, 1944, which is a division of this application.

Figure 4:
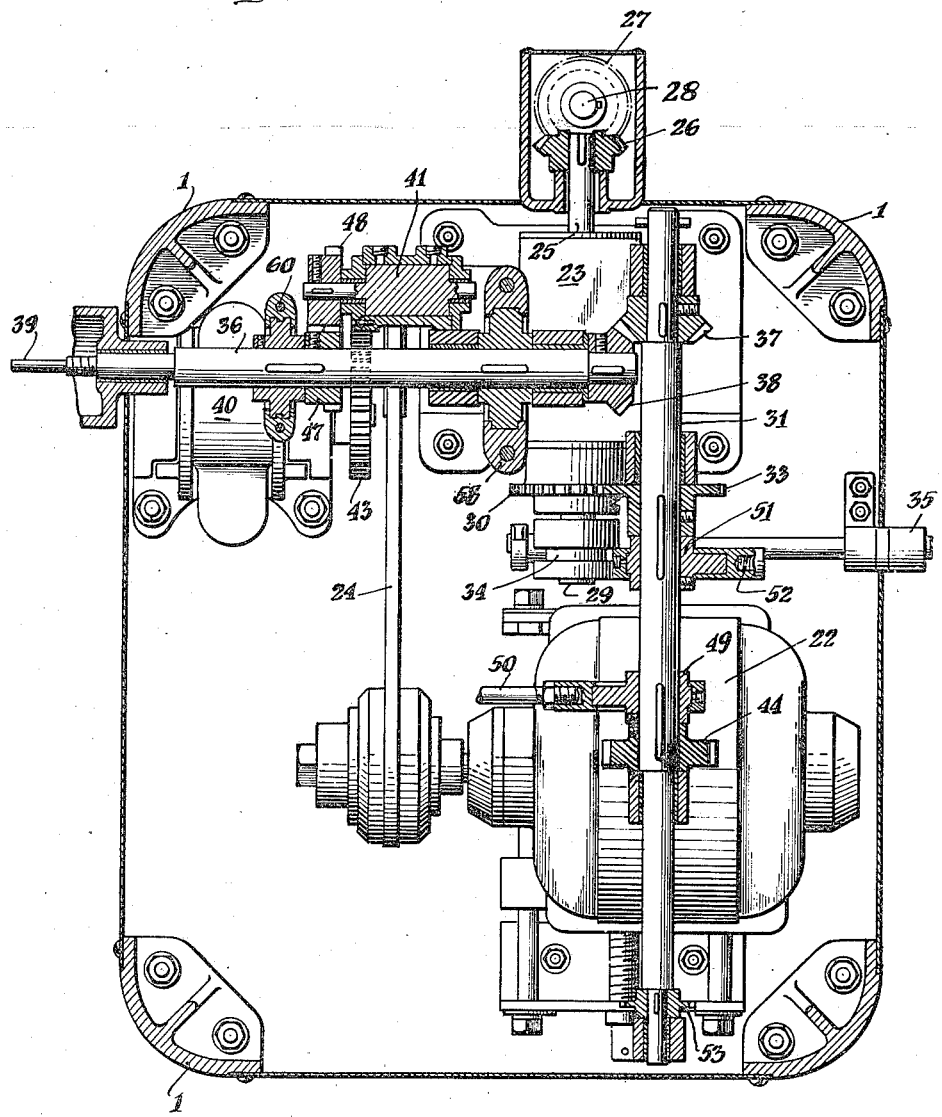
Fig. 4 is a horizontal section taken at the line 4—4 indicated on Fig. 1.

Summarizing the action of the machine with reference to the passage therethrough of a single cup, the cup 99 is fed into hopper portion 64 and is gated into the hopper extension where it is selected by a pin 77 traveling on pin ring 76. From there it is led in the manner above described to the point 85 (Fig. 8) where it falls endwise with its partially closed end forward into terminus 96 and passes through transfer tube 4 to the turning mechanism 6 (Figs. 9 and 10) where it is contacted by a finger 107 and pushed into transfer chute 97 where it drops into chute chamber 112 and is classified by the fingers 113—113' into one of the chutes whose termini are represented at 114 (Fig. 17). At this point, a chuck 120 on turret 8 having indexed at station A, the transfer mechanism 10 is moved forwardly where transfer rod 123 contacts the semi-closed end 100 of the cup lying in chute terminus 114 and carries the cup through aperture 141 into cup-receiving aperture 143 of chuck 120. The transfer mechanism 10 then moves backwardly leaving the cup positioned in the chuck aperture. The turret 8 is now moved by the Geneva mechanism until the turret chuck carrying said cup has indexed at station B it being understood that operations at stations A, B, C and D at turret 8 are simultaneously performed on the cups respectively presented to those stations and that the chuck containing the cup whose travel is now in question had been preliminarily indexed at the station intermediate A and B. The chuck having indexed at station B, the crosshead 169 bearing punches 170 descends cutting from foil 12 a wafer. To facilitate the cutting operation, a lubricant may be previously supplied to the metallic foil surface by some device such as lubricating pad 187 held by clamp 186 (Fig. 6). As the punch descends, vacuum is furnished thereto through duct 174 and punch chamber 173, and by reason of said vacuum the foil wafer, as cut, is held firmly on the end of punch 170 until that punch substantially reaches the full length of its stroke, at which time vacuum is terminated in the punch and an air blast substituted to blow the foil wafer from the punch and to seat it in the bottom of the cup. Simultaneously, vacuum is formed in chamber 150 which lies directly beneath station B and which communicates with aperture 143 of chuck 120 through aperture 144. Vacuum is furnished to chamber 150 through inlet 122 and said vacuum continues while the punch is withdrawn and until passage 144 of the turret chuck containing the newly assembled cups is in communication with chamber 151, at which time vacuum is terminated in chamber 150 preparatory to the next operation. The control of vacuum cycle in vacuum shoe chamber 150 and punch chamber 173, as well as the control of the air blast in chamber 173, is by means of rotary valve 41 which is constantly driven off shaft 36 (Fig. 4). During the passage of turret chuck 120 from station B to station C and during operation at station C, the foil wafer cut and seated in the cup at station B is firmly held in the bottom thereof, first, by means of the vacuum in vacuum shoe chamber 150 and later by means of the vacuum in vacuum shoe chamber 151 which vacuum is constant and is furnished through port 124 (Fig. 13). The preliminarily assembled cup and foil wafer having been carried to station C and having come to rest at that point, the hot punch assembly 19 moves forward pressing hot punch 191 firmly against a wafer 105 and adhesively securing said wafer to the bottom of said cup by means of the heat and pressure of the punch and the adhesive coating on the foil. This operation being complete, the hot punch assembly continues in the chuck to station D where, if it does not fall by gravity into transfer tubes 20, it is pushed from the chuck by the action of knockout tubes 55. The finished assembly falls downward through transfer tubes 20 which deliver either to a receptacle or, as herein specifically shown, to an inspection unit 21 where, if desired, the assembly may be inspected to determine whether the sealing operation has been properly effected. This completes the operation.

It will be apparent from the foregoing description that the invention therein described and hereafter claimed may be embodied in machines and methods for performing assembly operations other than those specifically described, and that the construction of the various parts may be widely varied without departing from the invention as defined in the appended claims.

Having thus described my invention, what I claim is:

1. In a machine for assembling, at a number of stations and in a sequence of steps, a thin shape in the perforate bottom of a cup-like article, said machine including an article receiving station, an assembly station and a uniting station at which the assembled parts are permanently joined, in combination, a work translating device positioned to successively present work to said stations, apertures positioned in said device and adapted to receive the articles, means for seating said articles in said apertures at the article receiving station, means positioned at the assembly station to seat the thin shape on the perforate bottom of said article, a vacuum chamber associated with said translating device and means connecting said apertures to said chamber to supply vacuum to said apertures during the movement of the work translating device from the assembly station to the uniting station whereby the thin shape is maintained seated on the bottom of said article.

2. In a machine for assembling, at a number of stations and in a sequence of steps, a thin shape in the perforate bottom of a cup-like article, said machine including an article receiving station, an assembly station and a uniting station at which the assembled parts are permanently joined, in combination, a turret having on its peripheral surface article receiving apertures, said turret being mounted to present the articles carried therein to various of said stations, a chamber, means for creating vacuum in said chamber, passages adapted to connect said chamber to said apertures when the apertures are presented to the assembly station, to a subsequent station and during travel therebetween, said passages terminating in said apertures at positions registering with the perforations in the bottom of an article seated in an aperture.

3. In a machine for assembling, at a number of stations and in a sequence of steps, a thin shape in the perforate bottom of a cup-like article, said machine including an article receiving station, an assembly station and a uniting station at which the assembled parts are permanently joined, in combination, a turret ring mounted to rotate about a fixed point and provided with article receiving apertures in its peripheral surface, a fixed shoe cooperating with the inner surface of the turret ring to form a chamber, passages extending from the bottom of the turret apertures through the inner surface of said ring and adapted to connect said apertures to said chamber as the apertures register with said chamber during rotation of said ring, and means for creating a vacuum in said chamber.

4. In a machine for assembling, at a number of stations and in a sequence of steps, a thin shape in the perforate bottom of a cup-like article, said machine including an article receiving station, an assembly station and a uniting station at which the assembled parts are permanently joined, in combination, a turret ring mounted for rotation around a fixed point to deliver to said stations work seated in apertures cut in the outer surface of said ring, means located at the article receiving station to seat said articles in said apertures, means located at the assembly station to seat said thin shapes on the bottoms of said articles, means located at said uniting station to permanently affix said shape to the bottom of the article, fixed means forming with the turret ring a chamber at the assembly station and connecting means consisting of passages extending from the bottom of the turret apertures to the inner surface of the turret ring to provide a connection between said apertures and said chamber as the turret positions the apertures at the assembly station.

5. In a machine for assembling, at a number of stations and in a sequence of steps, a thin shape in the perforate bottom of a cup-like article, said machine including an article receiving station, an assembly station and a uniting station at which the assembled parts are permanently joined, in combination, a turret ring mounted for rotation around a fixed point to deliver to said stations work seated in apertures cut in the outer surface of said ring, means located at the article receiving station to seat said articles in said apertures, means located at the assembly station to seat said thin shapes on the bottom of said articles, means located at said uniting station to permanently affix said shape to the bottom of the article, fixed means forming with the turret ring a chamber at the assembly station, similar fixed means forming with the ring a vacuum chamber coinciding with a substantial portion of the arc of travel of the turret between the assembly station and the uniting station and at the latter and connecting means consisting of passages leading from the bottoms of the turret apertures to the inner surface of the turret to provide connections between said apertures and said chambers at the assembly station and at the uniting station and over a substantial portion of the travel of the apertures therebetween.

6. In a machine for assembling, at a number of stations and in a sequence of steps, a thin shape in the perforate bottom of a cup-like article, said machine including an article receiving station, an assembly station and a uniting station at which the assembled parts are permanently joined, in combination, a turret ring mounted for rotation around a fixed point to deliver to said stations work seated in apertures cut in the outer surface of said ring, means located at the article receiving station to seat said articles in said apertures, means located at the assembly station to seat said thin shapes on the bottoms of said articles, means located at said uniting station to permanently affix said shape to the bottom of the article, fixed means forming with the turret ring a chamber at the assembly station, similar fixed means forming with the ring a vacuum chamber coinciding with a substantial portion of the arc of travel of the turret between the assembly station and the uniting station and at the latter, connecting means consisting of passages leading from the bottoms of the turret apertures to the inner surface of the turret to provide connections between said apertures and said chambers at the assembly station and at the uniting station and over a substantial portion of the travel of the aperture therebetween, means to maintain a constant vacuum in the second named chamber and valvular means to intermittently maintain a vacuum in the first named chamber at predetermined intervals.

7. In an assembly machine having a plurality of work stations for assembling in a sequence of steps a thin shape with a perforated cup-like article, in combination, a work translating device adapted to receive said article at one station and to thereafter present it to successive stations including an assembly station and a subsequent uniting station, means for seating said thin shape over said perforation in said article at the assembly station, and pneumatic means associated with said translating device and adapted to create reduced pressure at the perforation in the cup-like article to maintain the shape and article in assembled relationship during translation of the assembled work from the assembly station to the uniting station.

8. In an assembly machine having a plurality of work stations for assembling in a sequence of steps a thin shape with a perforated cup-like article, in combination, a work translating device adapted to receive said article at one station and to thereafter present it to successive stations including an assembly station and a subsequent uniting station, means for seating said thin shape over said perforation in said article at the assembly station, and pneumatic means adapted to create reduced pressure at said perforation to maintain the shape and article in assembled relationship during translation of the assembled work from the assembly station to the uniting station.

9. In an assembly machine having a plurality of work stations for assembling in a sequence of steps a thin shape with a perforated article, in combination, a work translating device adapted to receive said article at one station and to thereafter present it to successive stations including an assembly station, a subsequent uniting station, and a station beyond the latter, means for seating said thin shape over said perforation in said article at the assembly station and pneumatic means associated with said translating device and adapted to create reduced pressure at said perforation to maintain the shape and article in assembled relationship during translation of the work from the assembly station to the uniting station and until work at said uniting station has been completed.

10. In a machine for the assembling, at a number of stations and in a sequence of steps, of a thin shape with a shape receiving article, said machine including an assembly station at which said shape and said article are preliminarily assembled, in combination, means for translating said article to said assembly station, means for furnishing thin shapes to said assembly station and means for assembling said shape with an article, said latter means comprising a reciprocating member provided on its end with a seat for receiving and holding said thin shape during movement of said member, pneumatic means associated with said reciprocating member and adapted to furnish at said end a vacuum sufficient to retain the thin shape seated thereon and an air blast sufficient to force said thin shape therefrom, valvular means coordinated with the reciprocation of said member and adapted to valve vacuum to the member through a substantial portion of its reciprocation toward the assembly station and to valve air blast to the member through a portion of its reciprocation away from the assembly station, pneumatic means associated with said work translating means and adapted to supply vacuum thereto to hold the article and the thin shape carried thereby in assembled position and means governed by the movement of said reciprocating member to cause said last named pneumatic means to supply vacuum to said work translating means at the moment said reciprocating member moves away from the assembly station.

11. In combination, a member having a shape receiving end and operatively mounted for reciprocation toward and away from an article holding means, a source of reduced pressure connected with the shape receiving end of said member and adapted to normally create a vacuum at said end when a shape is seated therein, a source of reduced pressure associated with said article holding means and adapted to normally furnish vacuum thereto when the means is sealed by an article seated therein and valvular means controlling the supply of reduced pressure to said member and to said holding means and adapted to terminate said supply in said member during a portion of its reciprocatory cycle and to terminate said supply in said holding means during another portion of said cycle whereby simultaneous supply of reduced pressure to said member and to said holding means is avoided.

12. In a machine for assembling, at a plurality of stations and in a sequence of steps, a thin shape in the perforated bottom of a cup-like article, said machine including an article receiving station, an assembly station and a uniting station at which the assembled parts are permanently joined, in combination, a work translating device positioned to successively present work to some of said stations, apertures positioned in said device and adapted to receive the articles, means for seating said articles in said apertures at the article receiving station, means positioned at the assembly station to seat the thin shapes on the perforated bottoms of said article, means positioned at the uniting station for securing said thin shape in the article, and means associated with said translating device for maintaining said thin shape on the bottom of said article during the movement of the work translating device from the assembly station to the uniting station.

13. In that method of assembling an adhesively coated part and a perforated cup-like article to seal said perforation which comprises preliminarily assembling the coated part in position to close said perforation and thereafter completing final assembly by applying forces adapted to adhesively secure said part over said perforation, the improvement consisting in maintaining the assembled relationship prior to and during the securing operation by applying vacuum through said perforation to said coated part.

14. In combination with an assembly machine including elements arranged to seat a part within a cup-like article and to present the thus seated part to a uniting station, a work translating device adapted to contain the assembly and to carry the same to said station, a reciprocating member operating at said station to enter said cup-like article and contact the part seated thereon and perform work on said assembly, and means positioned at said station to prevent withdrawal of the assembly from the translating device during withdrawal of the reciprocating member from the cup-like article, said means being an element positioned across the line of travel of said reciprocating member and containing an aperture sized to pass said reciprocating member therethrough and sized to prevent passage therethrough of said cup-like article upon withdrawal of said reciprocating member from said article.

JAMES E. UNDERWOOD.